(12) United States Patent
Sherief et al.

(10) Patent No.: US 11,708,521 B2
(45) Date of Patent: Jul. 25, 2023

(54) RIGLESS METHOD FOR SELECTIVE ZONAL ISOLATION IN SUBTERRANEAN FORMATIONS USING POLYMER GELS

(71) Applicant: Saudi Arabian Oil Company, Dhahran (SA)

(72) Inventors: Mohamed Hassan Sherief, Dhahran (SA); Ayman Mohammed Almohsin, Dhahran (SA); Haider J. Abdulal, Dhahran (SA); Mohammed I. Alabdrabalnabi, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/644,217

(22) Filed: Dec. 14, 2021

(65) Prior Publication Data
US 2023/0183548 A1    Jun. 15, 2023

(51) Int. Cl.
E21B 33/138    (2006.01)
C09K 8/512    (2006.01)
C09K 8/516    (2006.01)
E21B 36/00    (2006.01)

(52) U.S. Cl.
CPC .............. *C09K 8/512* (2013.01); *C09K 8/516* (2013.01); *E21B 33/138* (2013.01); *E21B 36/001* (2013.01)

(58) Field of Classification Search
None
See application file for complete search history.

(56) References Cited

U.S. PATENT DOCUMENTS

| | | | |
|---|---|---|---|
| 796,909 | A | 8/1905 | Hardison |
| 2,229,177 | A | 1/1941 | Kennedy et al. |
| 2,630,410 | A | 3/1953 | Clapsadle et al. |
| 3,629,102 | A | 12/1971 | Lummus et al. |
| 3,708,428 | A | 1/1973 | McDonald |

(Continued)

FOREIGN PATENT DOCUMENTS

| | | |
|---|---|---|
| CA | 3063594 | 11/2018 |
| CN | 1221445 | 6/1999 |

(Continued)

OTHER PUBLICATIONS

U.S. Appl. No. 17/644,144, filed Dec. 14, 2021, Sherief et al.

(Continued)

*Primary Examiner* — Andrew Sue-Ako
(74) *Attorney, Agent, or Firm* — Fish & Richardson P.C.

(57) ABSTRACT

A method for zonal isolation in a subterranean formation includes identifying a zone of interest within the subterranean formation, determining a static temperature of the zone of interest, determining a time duration for gelation of a treatment fluid, determining a concentration of a cross-linker in the treatment fluid, determining a volume of the treatment fluid to be delivered to the zone of interest, determining a correlation between cooling of a wellbore near the zone of interest and a delivery rate of the treatment fluid, determining a target wellbore temperature, delivering a cooling stage until the target wellbore temperature is reached, and delivering a treatment stage. Delivering the cooling stage and the treatment stage results in forming, within the zone of interest, a gel that is impermeable to fluid flow.

12 Claims, 7 Drawing Sheets

(56) References Cited

U.S. PATENT DOCUMENTS

| | | | |
|---|---|---|---|
| 3,713,489 A | 1/1973 | Fast et al. | |
| 3,747,677 A | 7/1973 | Richardson | |
| 4,624,870 A | 11/1986 | Anthony | |
| 4,665,984 A | 5/1987 | Hayashi et al. | |
| 4,732,213 A | 3/1988 | Bennett et al. | |
| 4,809,781 A | 3/1989 | Hoefner | |
| 4,901,797 A | 2/1990 | Summers et al. | |
| 4,927,749 A | 5/1990 | Dorn | |
| 5,125,456 A | 6/1992 | Hutchins et al. | |
| 5,168,928 A | 12/1992 | Terry et al. | |
| 5,178,217 A | 1/1993 | Mohammadi et al. | |
| 5,185,024 A | 2/1993 | Siemer et al. | |
| 5,320,171 A | 6/1994 | Laramay | |
| 5,351,757 A | 10/1994 | Chou et al. | |
| 5,368,833 A | 11/1994 | Johansson et al. | |
| 5,617,920 A | 4/1997 | Dovan et al. | |
| 5,697,441 A | 12/1997 | Vercaemer | |
| 5,836,390 A | 11/1998 | Apps et al. | |
| 5,957,203 A | 9/1999 | Hutchins et al. | |
| 6,516,885 B1 | 2/2003 | Munday | |
| 7,013,973 B2 | 3/2006 | Danican et al. | |
| 7,273,101 B2 | 9/2007 | Davies et al. | |
| 7,458,424 B2 | 12/2008 | Odeh et al. | |
| 7,562,710 B2 | 7/2009 | Buchanan | |
| 7,677,313 B2 | 3/2010 | Tremblay et al. | |
| 7,712,528 B2 | 5/2010 | Langdon | |
| 7,854,277 B2 | 12/2010 | Duncum et al. | |
| 7,934,557 B2 | 5/2011 | Nguyen | |
| 7,954,549 B2 | 6/2011 | Lende et al. | |
| 7,985,789 B2 | 7/2011 | Albalat Perez et al. | |
| 8,053,479 B2 | 11/2011 | Masuda et al. | |
| 8,132,623 B2 | 3/2012 | Allin et al. | |
| 8,557,916 B1 | 10/2013 | Alsharaeh et al. | |
| 8,672,023 B2 | 3/2014 | O'Malley et al. | |
| 8,822,386 B2 | 9/2014 | Quintero et al. | |
| 8,853,301 B2 | 10/2014 | Jing et al. | |
| 9,045,965 B2 | 6/2015 | Patil et al. | |
| 9,133,386 B2 | 9/2015 | Kumar et al. | |
| 9,315,721 B2 | 4/2016 | Mahoney et al. | |
| 9,464,504 B2 | 10/2016 | Kakdjian et al. | |
| 9,475,981 B2 | 10/2016 | Abivin et al. | |
| 9,932,521 B2 | 4/2018 | Soane et al. | |
| 9,951,593 B2 | 4/2018 | Hussein et al. | |
| 10,683,726 B1 | 6/2020 | Al-Mulhenn et al. | |
| 10,774,211 B2 | 9/2020 | Alnnohsin | |
| 10,920,063 B2 | 2/2021 | Almohsin et al. | |
| 11,015,050 B2 | 5/2021 | Alnnohsin | |
| 11,053,426 B2 | 7/2021 | Kalgaonkar et al. | |
| 11,104,838 B2 | 8/2021 | Bataweel et al. | |
| 11,111,754 B2 | 9/2021 | Al-Mulhem et al. | |
| 11,220,581 B2 | 1/2022 | Almohsin et al. | |
| 2003/0121662 A1* | 7/2003 | Bosma | E21B 33/138 166/295 |
| 2004/0154799 A1 | 8/2004 | Powell | |
| 2004/0157749 A1 | 8/2004 | Ely et al. | |
| 2007/0029085 A1 | 2/2007 | Panga et al. | |
| 2008/0035343 A1 | 2/2008 | Odeh et al. | |
| 2008/0289812 A1 | 11/2008 | El-Khazindar et al. | |
| 2009/0010364 A1 | 4/2009 | Schafer et al. | |
| 2009/0143490 A1 | 6/2009 | Masuda et al. | |
| 2009/0205818 A1 | 8/2009 | Klunge et al. | |
| 2009/0221453 A1 | 9/2009 | Mukhopadhyay et al. | |
| 2010/0055458 A1 | 3/2010 | Jang et al. | |
| 2010/0096139 A1 | 4/2010 | Holcomb | |
| 2010/0119850 A1 | 5/2010 | Browne et al. | |
| 2010/0224366 A1 | 9/2010 | Lende et al. | |
| 2010/0230169 A1 | 9/2010 | Pomerleau | |
| 2010/0252259 A1 | 10/2010 | Horton | |
| 2011/0094746 A1 | 4/2011 | Allison et al. | |
| 2011/0214867 A1* | 9/2011 | Reddy | C09K 8/882 523/130 |
| 2012/0059089 A1 | 3/2012 | Greenwood et al. | |
| 2012/0103607 A1 | 5/2012 | Fitzpatrick | |
| 2012/0255887 A1 | 10/2012 | Holms et al. | |
| 2013/0065798 A1 | 3/2013 | Amanullah et al. | |
| 2013/0149211 A1 | 6/2013 | Bielawski et al. | |
| 2013/0166156 A1 | 6/2013 | Lin | |
| 2013/0292120 A1 | 11/2013 | Patil et al. | |
| 2013/0317135 A1 | 11/2013 | Vega | |
| 2014/0144637 A1 | 5/2014 | Gerrard | |
| 2014/0158354 A1 | 6/2014 | Kumar et al. | |
| 2014/0174739 A1 | 6/2014 | Bourcier et al. | |
| 2014/0262283 A1 | 9/2014 | Savari et al. | |
| 2014/0290943 A1 | 10/2014 | Ladva et al. | |
| 2015/0027710 A1 | 1/2015 | Miller | |
| 2015/0047846 A1* | 2/2015 | van Oort | E21B 43/26 166/302 |
| 2015/0060064 A1 | 3/2015 | Lafferty et al. | |
| 2015/0159079 A1 | 6/2015 | Huh et al. | |
| 2015/0322328 A1 | 11/2015 | Boul et al. | |
| 2015/0344765 A1 | 12/2015 | Kumar et al. | |
| 2016/0304772 A1 | 10/2016 | Al-Harbi | |
| 2016/0344035 A1 | 11/2016 | Zhamu et al. | |
| 2017/0058186 A1 | 3/2017 | Oghena | |
| 2018/0163122 A1 | 6/2018 | Panga et al. | |
| 2018/0193261 A1 | 7/2018 | Lee et al. | |
| 2018/0327648 A1 | 11/2018 | Bataweel et al. | |
| 2019/0112468 A1 | 4/2019 | Almohsin et al. | |
| 2019/0214647 A1 | 7/2019 | Arsalan | |
| 2019/0256770 A1 | 8/2019 | He et al. | |
| 2020/0048527 A1 | 2/2020 | Bataweel et al. | |
| 2020/0408063 A1 | 12/2020 | Almohsin et al. | |
| 2021/0130555 A1 | 5/2021 | Almohsin et al. | |
| 2021/0363402 A1 | 11/2021 | Bataweel et al. | |

FOREIGN PATENT DOCUMENTS

| | | |
|---|---|---|
| CN | 1745157 | 3/2006 |
| CN | 104449631 | 3/2015 |
| CN | 105755185 | 7/2016 |
| CN | 105801783 | 7/2016 |
| CN | 105924599 | 9/2016 |
| CN | 107814869 | 3/2018 |
| EP | 1866518 | 12/2007 |
| EP | 2454446 | 5/2012 |
| EP | 171753445 | 6/2017 |
| EP | 3331964 | 6/2018 |
| EP | 2454446 | 9/2019 |
| EP | 3619279 | 3/2020 |
| EP | 3619280 | 3/2020 |
| GB | 2106956 | 4/1983 |
| GB | 2503627 | 1/2014 |
| GB | 2506603 | 4/2014 |
| JP | 2005526887 | 9/2005 |
| RU | 2152967 | 7/2000 |
| RU | 2001132070 | 3/2004 |
| RU | 2008116114 | 10/2009 |
| RU | 2010130026 | 1/2012 |
| WO | WO 1995000739 | 1/1995 |
| WO | WO 1998037014 | 8/1998 |
| WO | WO 1999036359 | 7/1999 |
| WO | WO 2003033618 | 4/2003 |
| WO | WO 2004018381 | 3/2004 |
| WO | WO 2004035473 | 4/2004 |
| WO | WO 2004035474 | 4/2004 |
| WO | WO 2007017806 | 2/2007 |
| WO | WO 2008118239 | 10/2008 |
| WO | WO 2009034287 | 3/2009 |
| WO | WO 2010070600 | 6/2010 |
| WO | WO 2013107789 | 7/2013 |
| WO | WO 2014085770 | 6/2014 |
| WO | WO 2015124214 | 8/2015 |
| WO | WO 2019075314 | 4/2019 |

OTHER PUBLICATIONS

U.S. Appl. No. 17/550,138, filed Dec. 14, 2021, Sherief et al.

Aimohsin et al., "Nanosilica Based Fluid System for Water Shut-Off," Jul. 2017.

Al-Ghazal et al., "A new temporary chemical packer enables efficient stimulation of a lower zone in a HPHT gas well," SPE 161651, Society of Petroleum Engineers (SPE), presented at the

(56) References Cited

OTHER PUBLICATIONS

Abu Dhabi International Petroleum Exhibition and Conference on Nov. 11-14, 2012, 6 pages.
Al-Muntasheri et al., "Investigation of a High Temperature Organic Water Shutoff Gel: Reaction Mechanisms," Society of Petroleum Engineers (SPE), Dec. 2006, 8 pages.
Alsharaeh et al., "Evaluation of nanomechanical properties of (styrene-methyl methacrylate) copolymer composites containing graphene sheets," American Chemical Society, 2013, 11 pages.
Alsharaeh et al., "Microwave irradiation effect on the dispersion and thermal stability of RGO nanosheets within a polystyrene matrix," Materials, 2014, 7:212-224.
Bai et al., "Case Study on Preformed Particle Gel for In-depth Fluid Diversion," SPE 113997, Society of Petroleum Engineers (SPE), proceedings from the SPE/DOE Improved Oil Recovery Symposium, Apr. 19-23, 2008, 18 pages.
Chen et al., "Polyacrylamide and its derivatives for oil recovery," Dissertation for the degree of Doctor of Philosophy, Missouri University of Science and Technology, Fall 2016, 226 pages.
Dalrymple, "[5]P14 Water Control Treatment Design Technology," SPE 29194, Society of Petroleum Engineers (SPE), proceedings of the 15th World Petroleum Congress, Oct. 12-17, 1997, 3 pages.
Dovan et al., "Delaying Gelation of Aqueous Polymers at Elevated Temperatures Using Novel Organic Crosslinkers," SPE 37246, Society of Petroleum Engineers (SPE), presented at the SPE International Symposimon Oilfield Chemistry, Houston, TX, Feb. 18-21, 1997, 11 pages.
Esmaeilzadeh et al., "Wettability alteration of carbonate rocks from liquid-wetting to ultra gas-wetting using TiO2, SiO2 and CNT nanofluids containing flurorchemicals, for enhanced gas recovery," Journal of Natural Gas Science and Engineering, vol. 26, Sep. 2015, 12 pages.
Freyer et al., "Swelling Packer for Zonal Isolation in Open Hole Screen Completions," SPE 78312, Society of Petroleum Engineers (SPE), presented at the SPE 13th European Petroleum Conference, Oct. 29-31, 2002, 5 pages.
Gilardo et al., "Wettability alteration of sandstone cores by alumina-based nanofluids," Energy and Fuels, 27:7, Jul. 18, 2013, 7 pages.
Greenwood and Gevert, "Aqueous silane modified silica sols: theory and preparation," Pigment and Resin Technology, 40:5, 2011, 10 pages.
Gunnarsson et al., "Technology Update: New Tool and Sealant Technology Expedites Annular Isolation Tasks," Society of Petroleum Engineers (SPE), JPT, Jul. 2016, 2 pages.
Huang et al., "Systematic Approach to Develop a Colloidal Silica Based Gel System for Water Shut-Off," SPE-183942-MS, Society of Petroleum Engineers (SPE), Mar. 9, 2017, 19 pages.
Iler and Dalton, "Degree of Hydration of Particles of Colloidal Silica in Aqueous Solution," Journal of Physical Chemistry, 60:7, Jul. 1956, 3 pages.
Iller, "The Chemistry of Silica," John Wiley & Sons, Jun. 1979, 5 pages.
Khan et al., "Graphene based metal and metal oxide nanocomposites: synthesis, properties and their applications," Journal of Materials Chemistry A, 3:37, Jan. 1, 2015, 57 pages.
Kondiparty et al., "Dynamic Spreading of Nanofluids on Solids. Part 1: Experimental," American Chemical Society, Langmuir 28, Sep. 11, 2012, 6 pages.
Kumar et al., "Nanostructured zirconia decorated reduced graphene oxide based efficient biosensing platform for non-invasive oral cancer detection," Biosensors and Bioelectronics, 78, Apr. 1, 2016, 8 pages.
Li et al., "Fabrication and properties of machinable 3Y—Zr0 2/BN nanocomposites," Materials Science and Engineering: A, Elsevier, Amsterdam, 397:1-2, Apr. 25, 2005, 6 pages.
Ligthelm, "Water Shut-off in Gas Wells: Is there Scope for a Chemical Treatment?," SPE 68978, Society of Petroleum Engineers (SPE), presented at the SPE European Formation Damage Conference, May 21-22, 2001, 10 pages.

Liu et al., "Microwave-assisted synthesis of TiO2-reduced graphene oxide composites for the photocatalytic reduction of Cr(vi)," RSC Advances, 1:7, Jan. 1, 2011, 5 pages.
Liu et al., "Photolatently modulable hydrogels using unilamellar titania nanosheets as photocatalytic crosslinkers," Nature Communications, 4:1, Jun. 18, 2013, 7 pages.
Liu et al., "Tough and highly stretchable graphene oxide/polyacrylamide nanocomosite hydrogels," Journal of Materials Chemistry, 22:28, Jan. 1, 2012, 8 pages.
Mahdavi et al., "Polyacrylamide/reduced graphene oxide-Ag nanocomposite as highly efficient antibacterial transparent film," Iranian Chemical Society, Journal, 14:1, Aug. 6, 2016, 10 pages.
Michael et al., "Enhanced Polyacrylamide Polymer Gels using Zirconium Hydroxide Nanoparticles from Water Shutoff at High Temperatures: The Thermal and Rheological Investigations," Ind. Eng. Chem. Res., 57:48, Nov. 6, 2018, 27 pages.
Mordina et al., "Impact of graphene oxide on the magnetorheological behaviour of BaFe12O19nanoparticles filled polyacrylamide hydrogel," Polymer, Elsevier Science Publishers B.V., GB, 97, May 11, 2016, 15 pages.
Nasr-El-Din and Taylor, "Evaluation of sodium silicate/urea gels used for water shut-off treatments," Journal of Petroleum Science and Engineering 48:3-4, Sep. 15, 2005, 20 pages.
Ogolo et al., "Enhanced Oil Recovery Using Nanoparticles," SPE 160847, Society of Petroleum Engineers (SPE), SPE International, presented at the SPE Saudi Arabia Section Technical Symposium and Exhibition, Apr. 8-11, 2012, 9 pages.
Pan et al., "Tough, Stretchable, Compressive, Novel Polymer/ Graphene Oxide Nanocomposite Hydrogels with Excellent Self-Healing Performance," ACS Applied Materials and Interfaces, published online Oct. 11, 2017, 28 pages.
Pham et al., "Rheological evaluation of a sodium silicate gel system for water management in mature, naturally-fractured oilfields," Journal of Petroleum Science and Engineering, 138, Dec. 4, 2015, 16 pages.
Sears, "Determination of Specific Surface Area of Colloidal Silica by Titration with Sodium Hydroxide," Analytical Chemistry 28:12, Dec. 1956, 3 pages.
Sepehrinia and Mohammadi, "Wettability alteration properties of fluorinated silica nanoparticles in liquid-loaded pores: An atomistic simulation," Applied Surface Science 371, May 15, 2016, 11 pages.
Seright, "Washout of Cr (III)-Acetate-HPAM Gels from Fractures," SPE 80200, Society of Petroleum Engineers (SPE), proceedings from the SPE International Symposium on Oilfield Chemistry, Feb. 5-7, 2003, 10 pages.
Shan et al., "Graphene oxide enhanced polyacrylamide-alginate aerogels catalysts," Carbohydrate Polymers, 203, Jan. 1, 2019, 26 pages.
Song et al., "Plasma-induced grafting polyacrylamide on graphene oxide nanosheets for simultaneous removal of radionuclides," Physical Chemistry Chemical Physics (RSC Publishing), Jan. 1, 2015, 24 pages.
Stengl et al., "h—BN—TiO 2 Nanocomposite for Photocatalytic Applications," Journal of Nanomaterials, 2016, Jan. 1, 2016, 12 pages.
Taha et al., "Nano Graphene Application Improving Drilling Fluids Performance," presented at the International Petroleum Technology Conference, Doha, Qatar, Dec. 6-9, 2015, 16 pages.
Taha et al., "Overview of Water Shutoff Operations in Oil and Gas Wells; Chemical and Mechanical Solutions," chemengineering MDPI, Department of Petroleum Engineering, Texas A&M University at Qatar, May 2019, 3(2), 51, 11 pages.
Target Intervention No., "Real-Time, Fully Electric TP1 Straddle Tool," targetinvention.no, available on or before Feb. 13, 2018, 1 page.
Tongwa et al., "Evaluation of a nanocomposite hydrogel for water shut-off in enhanced oil recovery applications: Design, synthesis, and characterization," J. Appl. Polym. Sci, 2012, 128:787-794.
Veil et al., "A White Paper Describing Produced Water from Production of Crude Oil, natural Gas and Coal Bed methane," Technical Report prepared for the National Energy Technology Laboratory (US DOE, under Contract No. W-31-109-Eng-38, Jan. 2004, 87 pages.

(56) References Cited

OTHER PUBLICATIONS

Villamizar et al., "SPE 129901: Interfacially Active SWNT/Silica Nanohybrid Used in Enhanced Oil Recovery," SPE International, presented at the 2010 SPE Improved Oil Recovery Symposium, Apr. 26-28, 2010, 11 pages.

Wu et al., "Poly (2-acrylamide-2-methylpropanesulfonic acid)-modified SiO 2 Nanoparticles for Water-based Muds," American Chemical Society—Industrial and Engineering Chemistry Research, 56:1, Dec. 20, 2016, 7 pages.

Zhang et al., "Engineering the Unique 2D Mat of Graphene to Achieve Graphene-TiO 2 Nanocomposite for Photocatalytic Selective Transformation: What Advantage does Graphene Have over Its Forebear Carbon Nanotube?" ACS NANO, 5:9, Sep. 27, 2011, 10 pages.

Zhang et al., "TiO 2-Graphene Nanocomposites for Gas-Phase Photocatalyptic Degradation of Volatile Aromatic Pollutant: Is TiO 2-Graphene Turley Different from Other TiO 2-Carbon Composite Materials?" ACS NANO, 4:12, Dec. 28, 2010, 12 pages.

Zhou et al., "Preparation of a reduced graphene oxide/zirconia nanocomposite and its application as a novel lubricant oil additive," RSC Advances, 5:111, Jan. 1, 2015, 11 pages.

Zolfaghari et al., "Preparation and characterization of nanocomposite hydrogels based on polyacrylamide for enhanced oil recovery applications," J. Appl. Polym. Sci., 2006, 100:2096-2103.

\* cited by examiner

100

RIGLESS METHOD FOR SELECTIVE ZONAL ISOLATION IN SUBTERRANEAN FORMATIONS USING POLYMER GELS

TECHNICAL FIELD

The present disclosure is directed to selective zonal isolation in subterranean formations, for example, for water and/or gas control in wellbore applications.

BACKGROUND

A common problem experienced during the extraction of mineral hydrocarbons (for example, crude oil and natural gas) from subterranean reservoirs is co-extraction of undesired fluid (such as water and/or gas). Co-extraction of water along with mineral hydrocarbons requires expensive separation, treatment, and disposal, which in many cases involves re-injection back into the well. Similar issues arise in oil-wells/wellbores with ingress of unwanted gas, since the gas must be reprocessed for re-injection or fed to a connected distribution pipeline. In many operations, gas handling capabilities are not readily available, so co-production of gas is ideally minimized. Saturated reservoirs with a gas cap overlying a thin oil column can be challenging to develop and exploit. The challenges can be associated with draining the oil while preserving the gas cap for later in order to maximize hydrocarbon recovery. In sum, undesired fluid production (such as water and/or gas) may partially or completely impair well productivity and, in extreme cases, may lead to a complete loss of hydrocarbon production from a well.

There are many ways that water and gas can enter a subterranean zone, such as, for example, a wellbore or reservoir, during hydrocarbon extraction, for example through porous rock formations such as sedimentary layers or via networks of fissures or cracks that link with a source of water or gas. Various mechanical and chemical treatments can be used to prevent (for example, shut-off), or at least reduce, the ingress of water or gas. Chemical treatments include the use of gels. In gel-type systems, it is important to ensure that the gelation time is controlled, in order to allow sufficient time for the treatment fluid to penetrate sufficiently far into the rock formation to provide a sufficient barrier, while not allowing it to penetrate too far such that dilution renders any gel barrier to be ineffective. It is also necessary for such gelling systems to function effectively under the high temperature and pressure conditions associated with subterranean hydrocarbon producing wells.

SUMMARY

Certain aspects of the subject matter described can be implemented as a method for zonal isolation in a subterranean formation. A zone of interest within the subterranean formation is identified. A static temperature of the zone of interest is determined. For each of various temperature, a time duration for gelation of a treatment fluid over a range of concentrations of a cross-linker is determined. At least one of the various temperatures is the static temperature. The treatment fluid includes a polymer and the cross-linker. The cross-linker is configured to cause cross-linking of the polymer. A first concentration of the cross-linker for a treatment stage and a second concentration of the cross-linker for a cooling stage are determined based on the determined time durations for gelation of the treatment fluid over the range of concentrations of the cross-linker. A treatment volume of the treatment stage to be delivered to the zone of interest is determined. A correlation between cooling of a wellbore formed in the subterranean formation near the zone of interest and a delivery rate of the treatment stage to be delivered to the zone of interest is determined. A target wellbore temperature for the wellbore is determined. The target wellbore temperature is less than the static temperature of the zone of interest. The cooling stage is delivered to the subterranean formation via the wellbore until the wellbore near the zone of interest reaches the target wellbore temperature. The cooling stage includes the polymer and the second concentration of the cross-linker. The treatment volume of the treatment stage is delivered to the zone of interest via the wellbore after the cooling stage is delivered, thereby forming, within the zone of interest, a gel that is impermeable to fluid flow. The treatment stage includes the polymer and the first concentration of the cross-linker.

This, and other aspects, can include one or more of the following features. The second concentration of the cross-linker for the cooling stage can be less than the first concentration of the cross-linker for the treatment stage. In some implementations, a hydrocarbon is produced from the subterranean formation after delivering the treatment stage (and in some cases, immediately after). In some implementations, the wellbore is not shut in throughout implementation of the method. The cooling stage and the treatment stage can be delivered to the subterranean formation using a coiled tubing installed in the wellbore. In some implementations, the coiled tubing is removed from the wellbore after delivering the treatment stage. In some implementations, the hydrocarbon is produced from the subterranean formation after the coiled tubing (and other equipment, for example, attached to the coiled tubing) is removed. A flush stage can be delivered to the subterranean formation via the wellbore after delivering the treatment stage. The flush stage can include water. Each of the first concentration and the second concentration can be in a range of from about 1 volume percent (vol. %) to about 10 vol. %. A difference between the target wellbore temperature and the static temperature can be 50 degrees Fahrenheit differential or less. The difference between the target wellbore temperature and the static temperature can be 25 degrees Fahrenheit differential or less. Delivering the treatment stage can include delivering the treatment stage at an adjustable delivery rate, such that a temperature of the wellbore near the zone of interest is maintained at the target wellbore temperature. Delivering the treatment stage can include delivering the treatment stage at the adjustable delivery rate, such that the temperature of the wellbore near the zone of interest is maintained within 50 degrees Fahrenheit differential of the target wellbore temperature. Delivering the treatment stage can include delivering the treatment stage at the adjustable delivery rate, such that the temperature of the wellbore near the zone of interest is maintained within 25 degrees Fahrenheit differential of the target wellbore temperature.

DETAILED DESCRIPTION

Figure 1A:
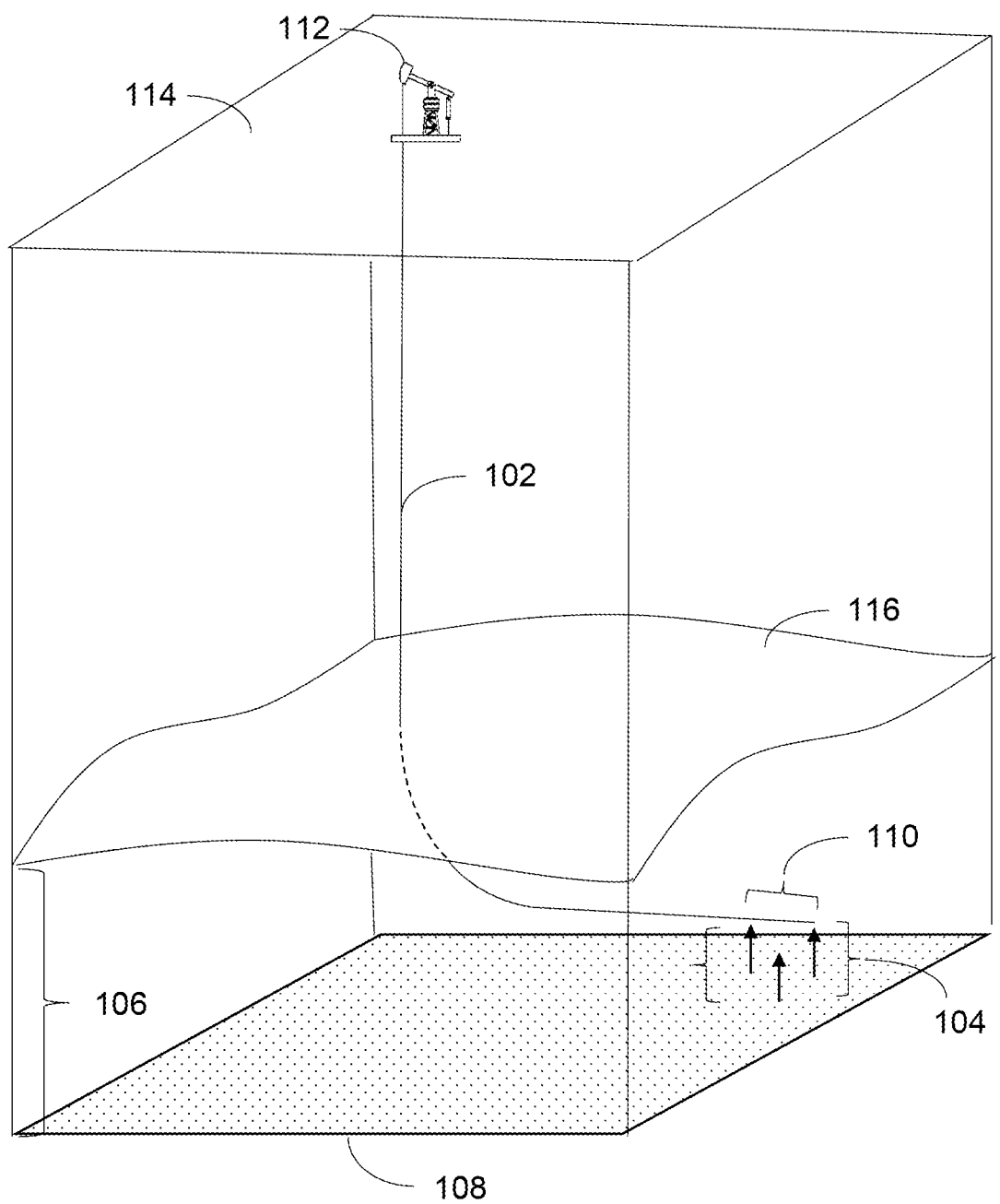
FIG. 1A is a schematic diagram of an example well.

The success of treatments for selective zonal isolation in subterranean formations depends on the ability of a treatment fluid to penetrate deep enough into the formation to bridge undesired fluid zones as quickly as possible, without losing production from remaining portions of the well. Some challenges that may be encountered using traditional treatment fluids include: the gelation time in relation to the treatment volume required to pump can be too short to place in the well, resulting in the risk of downhole equipment getting stuck in the wellbore; the gelation time in relation to the treatment volume required to pump can be too long, resulting in the risk of the gel dissipating and being too dilute and/or flowing back from the formation and into the wellbore, thereby failing to properly bridge undesired fluid zones and creating the desired flow barrier; and the location of the undesired fluid zones for bridging may limit or prevent future access to underlying production zones containing valuable hydrocarbons.

Some examples of common downhole equipment that can be used to deliver conventional treatment fluid to subterranean formations include batch mixers, pumps, coiled tubing, downhole inflatable retrievable production packers, and retrievable or drillable composite plugs. In conventional treatment methods, a retrievable or drillable plug is set below the desired treatment depth, while an inflatable production packer is set above the desired treatment depth. Depending on the desired treatment depth and the specific types of plugs and packers used, the setting and unsetting of such downhole equipment may take a few hours and in some cases, up to a few days. Further, running the coiled tubing to the desired treatment depth and running it out of hole may also take several hours. Some conventional treatment methods require mixing of the treatment fluid at the surface in batch mixers, or the treatment fluid is shipped to the wellsite already mixed and at a fixed cross-linker concentration. Once ready, the treatment fluid can be pumped downhole to the desired treatment depth, for example, via coiled tubing and through the inflatable production packer. The treatment fluid can be prepared to achieve gelation after pumping and retrieving downhole equipment to avoid gluing the inflatable production packer and the coiled tubing inside the wellbore. In some cases, a residual of the treatment fluid is purposefully left inside the wellbore to avoid gel from flowing back from the formation and into the wellbore, thereby ensuring blocking of the undesired fluid zone. In such cases, obtaining access to the wellbore after completing the treatment process requires milling and cleaning of undesired solids left inside the wellbore by the treatment process. Overall, such conventional methods from beginning to end may be lengthy in time and expensive in costs, along with the carried risk of losing or damaging the wellbore in the process. Depending on the treatment volume, conventional rigless chemical shut-off treatment processes may take from days to weeks. Further, conventional rigless chemical shut-off treatment processes may require the well to be kept shut-in for some time duration after the treatment process has been completed in order to allow for the treatment to cure and form a blockage.

The subject matter described in this disclosure can be implemented so as to realize the following advantages. The treatment method for selective zonal isolation in subterranean formations described here can be implemented from beginning to end within a single day. The treatment method for selective zonal isolation in subterranean formations described here can include maintaining the wellbore at a temperature that is cooler than the temperature of the zone of interest (zone in which fluid flow is undesired and therefore the target zone for the selective isolation) throughout implementation of the treatment method, which can mitigate and/or eliminate the risk of getting downhole equipment stuck within the wellbore and can mitigate and/or eliminate the risk of plugging the wellbore and losing production of valuable hydrocarbons from the well. The treatment fluid used in the treatment method for selective zonal isolation in subterranean formations described here can bridge undesired fluid zones without delay within the subterranean formation. The treatment method for selective zonal isolation in subterranean formations described here can be completed without requiring wellbore cleanout operations to regain access to the wellbore, unlike conventional methods. Further, the treatment method for selective zonal isolation in subterranean formations described here can be completed without requiring shutting in of the well for a time duration after delivery of the treatment fluid.

FIG. 1A is a schematic drawing of a well 100 including a wellbore 102. The well 100 shown in FIG. 1A exhibits increased production of water 104 in a reservoir layer 106 in a subterranean formation. The water 104 may come from an underlying water table, or water layer 108, below the reservoir layer 106. A zone 110 of the wellbore 102 closest to the water layer 108 may draw water 104 into the wellbore 102 during the production cycle of the well 100, increasing the amount of produced water. In other circumstances, a continuous production from the reservoir layer 106 to the surface 114 may entrain water 104 from the water layer 108, increasing the amount of water 104 produced from the zone 110 of the wellbore 102. Further, as the reservoir layer 106 is produced, the amount of hydrocarbons between the water layer 108 and a cap rock layer 116 decreases, which may allow the water layer 108 to draw closer to the cap rock layer 116, moving closer to the zone 110 of the wellbore 102. This may also increase the amount of water 104 produced.

The well 100 enables access to the subterranean zones of interest to allow recovery (that is, production) of fluids to the surface 114 and, in some implementations, additionally or alternatively allows fluids to be placed in the Earth. In some implementations, the subterranean zone 110 is a formation within the Earth defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing hydrocarbon gas (such as natural gas) from the subterranean zone(s) of interest 110 to the surface 114. While termed a "gas well," the well need not produce only dry gas, and may produce liquid including oil, water, or both. In some implementations, the well 100 is an oil well that is used in producing hydrocarbon liquid (such as crude oil) from the subterranean zones of interest 110 to the surface 114. While termed an "oil well," the well not need produce only hydrocarbon liquid, and may produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth. The wellhead defines an attachment point for other equipment to be attached to the well 100. The pump jack 112 may include valves used to regulate flow into or out of the well 100.

In various embodiments described herein, a polymer and a cross-linker may be used to form a gel, blocking production from the zone 110 of the wellbore 102. As described further with respect to FIGS. 1C, 2, and 3, in various implementations, a polymer is injected into the wellbore 102 as a treatment fluid to the zone 110 to be shut off. The polymer may be pushed into the zone 110, for example, through the perforations in the production tubing at that point. A cross-linker may also be injected into the wellbore 102, causing the polymer to cross-link and form a gel in the zone 110.

Figure 1B:
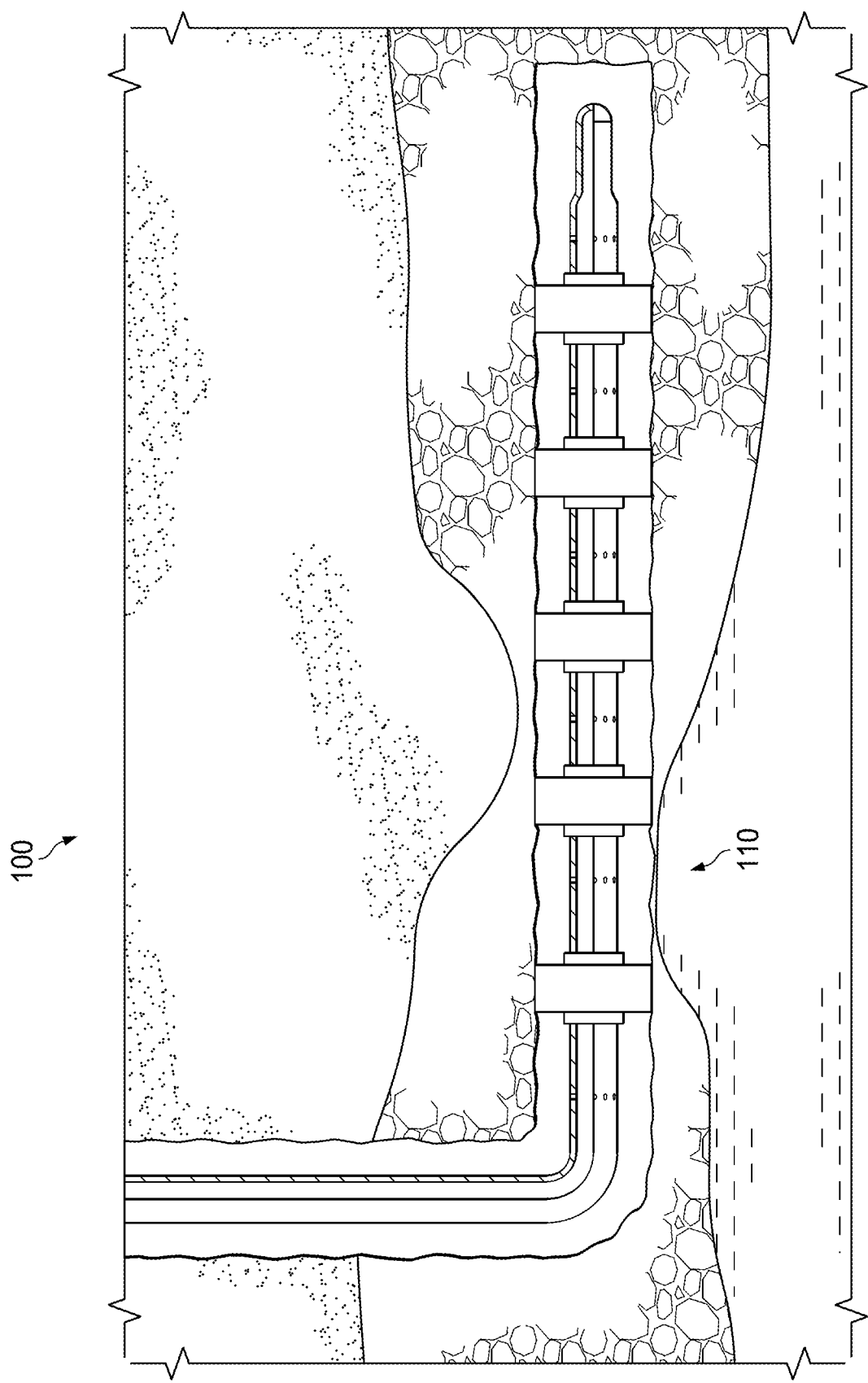
FIG. 1B is a schematic diagram showing another view of the well of FIG. 1A.

FIG. 1B depicts another view of the well 100. In some cases, as shown in FIG. 1B, undesired fluids (such as gas and/or water for oil producing wells) may impair well productivity and can even lead to a complete loss of production. In the example shown in FIG. 1B, oil production is impaired by water and gas breakthrough at the zone 110. Breakthrough of undesired fluids can be particularly challenging in some locations, such as a well heel or a middle section of a well. During oil production, gas and/or water breakthrough can reduce well oil production, which can lead to increased operational costs associated with separating and disposing of the undesired fluids. Blockage of such undesired fluids from entering the wellbore 102 can therefore improve well productivity, reduce operational costs, and consequently reduce the carbon footprint of the well 100.

Figure 1C:
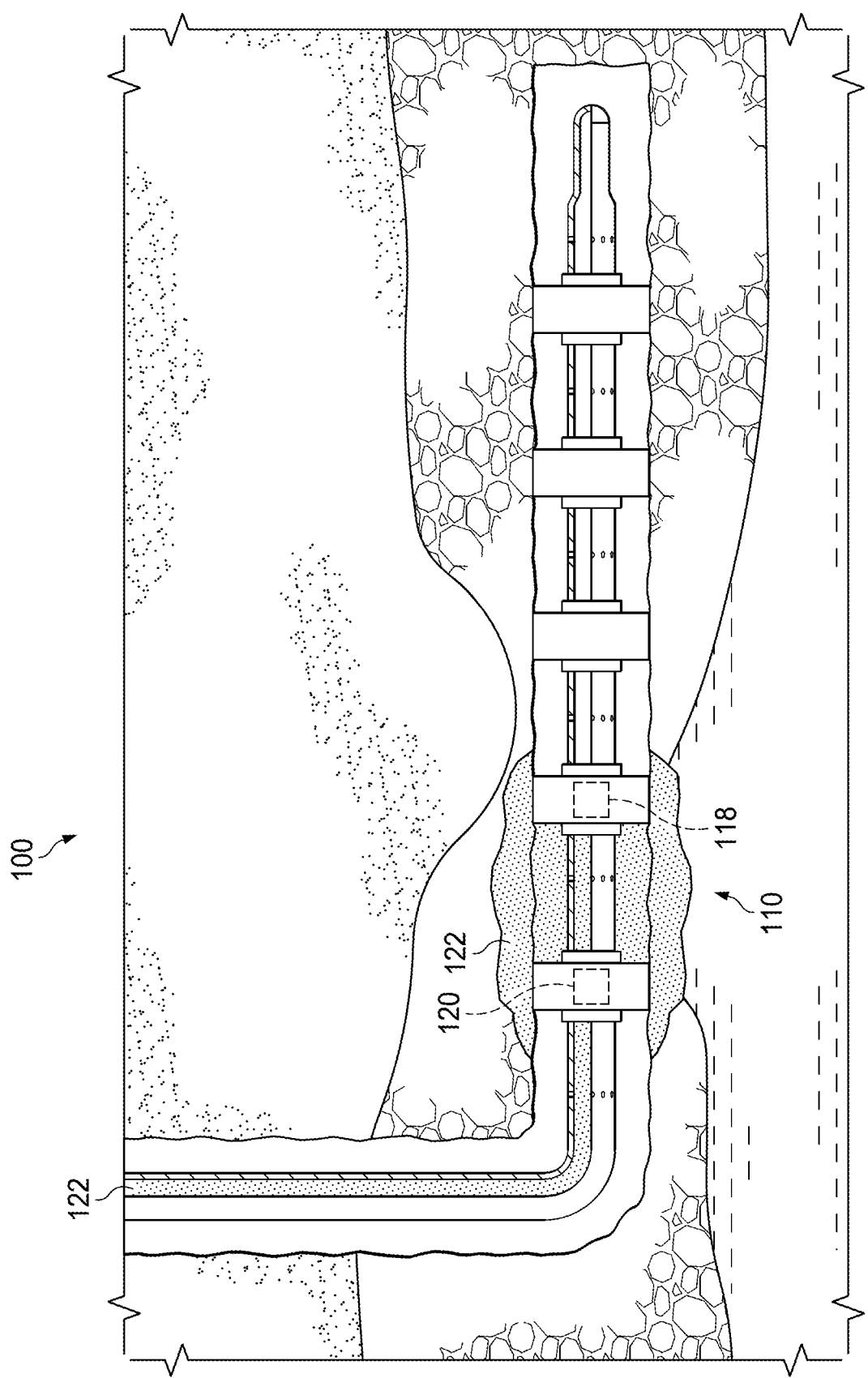
FIG. 1C is a schematic diagram showing the view of the well of FIG. 1B being treated with a treatment fluid.

FIG. 1C depicts the well 100 being treated with a treatment fluid 122. In the example shown in FIG. 1C, oil production is impaired by water breakthrough. A retrievable bridge plug 118 and a retrievable production packer 120 can be set in the well 100. The treatment fluid 122 can be delivered to a zone of interest (for example, a zone in which water breakthrough has occurred) using a tubing, such as coiled tubing. The bridge plug 118 and production packer 120 can be set, such that the treatment fluid 122 is delivered only to the zone of interest 110 and not to other portions of the wellbore 102. The treatment fluid 122 can solidify to form a gel, thereby creating a solid barrier that prevents fluid flow and therefore effectively shuts off the water breakthrough. As used in this disclosure, the term "gel" when used in the context of the polymer gel treatment fluid 122, may refer to a dilute cross-linked polymer system that exhibits no flow at steady-state.

The treatment fluid 122 includes a polymer and a cross-linker. The polymer is a polymer that is capable of cross-linking to form a cross-linked polymer matrix within the zone of interest 110. In some implementations, the polymer is a polyacrylamide homopolymer, a copolymer of acrylamide monomer units and acrylate monomer units, or a combination of these. In some implementations, the copolymer of acrylamide monomer units and acrylate monomer units is poly[acrylamide-co-(tert-butyl acrylate)] (PAtBA).

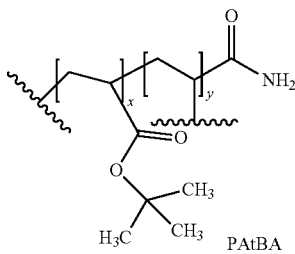

In structural formula (I), x is the number of tert-butyl acrylate monomer units, and y is the number of acrylamide monomer units. The polymer has an average molecular weight sufficient, such that when the polymer is cross-linked by the cross-linker, the resulting cross-linked polymer gel reduces or prevents the flow of fluids (such as water or water-containing fluids) through the gel, for example, formed in the zone of interest 110.

The cross-linker is a cross-linker that is capable of cross-linking the polymer to form a cross-linked polymer matrix within the zone of interest 110. In some implementations, the cross-linker is an organic cross-linker. In some implementations, the cross-linker includes an imine functional group. In some implementations, the cross-linker is polyethyleneimine. The polyethyleneimine can be a linear polyethyleneimine or a branched polyethyleneimine. The cross-linker has an average molecular weight sufficient to cross-link the polymer to produce a cross-linked polymer gel within the zone of interest 110.

In some implementations, the treatment fluid 122 includes an adsorption system. The adsorption system may increase the adhesion of the cross-linked polymer gel to a rock surface of the pores of the subterranean formation in the zone of interest 110. The adsorption system may include a silane compound or a silane compound and a silicate component. In some implementations, the treatment fluid 122 has a viscosity in a range of from 5 centipoise (cP) to 10 cP prior to injection into the zone of interest 110.

The treatment fluid 122 may also include an additive. Some examples of suitable additives include salts, fillers, organic compounds, preservatives, and rheology modifiers. Salts may be added to the treatment fluid 122 to reduce or prevent clay swelling in the subterranean formation. Some examples of suitable salts include alkali metal chlorides, hydroxides, and carboxylates. The salts included in the treatment fluid 122 can include sodium, calcium, cesium, zinc, aluminum, magnesium, potassium, strontium, silicon, lithium, ammonium, chlorides, bromides, carbonates, iodides, chlorates, bromates, formats, nitrates, sulfates, phosphates, oxides, fluorides, or any combination of these. For example, the treatment fluid 122 can include calcium chloride, ammonium chloride, potassium chloride, or any combination of these. In some implementations, the treatment fluid 122 includes filler particles, such as silica particles.

As mentioned previously, the treatment fluid 122 solidifies to form a gel. The treatment fluid 122 includes a cross-linker. The cross-linker is configured to cause or facilitate reactions that cause the polymer to cross-link, resulting in formation of a gel. The polymer can react with the cross-linker to transform into a cross-linked polymer gel. Therefore, the cross-linker can cause the formation of the gel. In some implementations, the cross-linker is configured to cause the polymer to cross-link and result in an increased viscosity of the treatment fluid 122. For example, transition of the polymer from a flowable liquid to a cross-linked gel may include formation of covalent bonds between individual polymers via cross-linking reactions, which may build viscosity in the treatment fluid 122. The concentration of cross-linker in the treatment fluid 122 can depend on the temperature of the subterranean formation at the zone of interest. In some implementations, the concentration of cross-linker in the treatment fluid 122 is in a range of from about 0.3 weight percent (wt. %) to about 2 wt. %.

As used in this disclosure, the term "gelation time" when used in the context of the polymer gel treatment fluid 122, may refer to a time duration between a first time at which the cross-linker is introduced to the polymer and a second time at which the polymer in the treatment fluid 122 has cross-linked to form the cross-linked polymer gel capable of reducing or preventing the flow of fluids through the gel. In some implementations, the treatment fluid 122 has a gelation time of about 1 hour or more at a temperature of 120 degrees Celsius (° C.). In some implementations, the treatment fluid 122 has a gelation time of no more than 48 hours at a temperature of 120° C. In some implementations, the treatment fluid 122 has a gelation time in a range of from about 1 hour to about 48 hours, or about 1 hour to about 24 hours, such as about 1 hour, about 2 hours, about 3 hours, about 4 hours, about 5 hours, about 10 hours, about 12 hours, about 16 hours, about 20 hours, about 24 hours, about 30 hours, about 36 hours, about 42 hours, or about 48 hours.

In some implementations, the gelation time of the treatment fluid 122 can be controlled. In some implementations, control of gelation times can be achieved by tailoring the ratio of the polymer to cross-linker in the treatment fluid 122. In some implementations, the optimum ratio depends on the nature of the polymer and/or the cross-linker, and on the conditions and nature of the porous rock formations that are involved.

In some implementations, the gelation process is activated by the formation temperature. In some implementations, the formation temperature is the temperature inside the desired location (zone of interest) in the subterranean zone. In some implementations, in situ gelation takes place to plug (partially or completely) pore spaces, thereby limiting undesired water and/or gas production. In some implementations, the internal volume of the formation into which the treatment fluid 122 is flowed is substantially plugged by the gel that forms within the formation. In some implementations, substantial plugging results in fluid in the formation (for example water, gas, or other fluid) not being able to escape into the wellbore 102. In some implementations, the chemical concentration or the quantity of cross-linker (or both) can be used to control gelation time, thereby allowing a predictable and controllable pumping time, ranging from a few minutes to several hours at a given temperature.

With conventional methods and conventional treatment fluids, there is a risk that the downhole tools (such as the coiled tubing, the bridge plug 118, and the production packer 120) will get stuck as the treatment fluid solidifies within the zone of interest. If that happens, the well 100 becomes plugged and can result in a complete loss. The methods and treatment fluid 122 described in this disclosure can be implemented, such that downhole equipment can be retrieved immediately after squeeze operations and therefore minimize and/or eliminate the aforementioned risk. The methods and treatment fluid 122 described in this disclosure can be implemented, such that production from the well 100 can be continued immediately after the treatment method has been completed without the need to shut in the well 100, which can minimize costs and production downtime. The methods and treatment fluid 122 described in this disclosure can be implemented, such that cleaning operations (such as milling) to remove solid residuals or to regain access to partially or completely blocked portion(s) of the wellbore 102 is not necessary, which can also minimize costs and production downtime.

Figure 2:
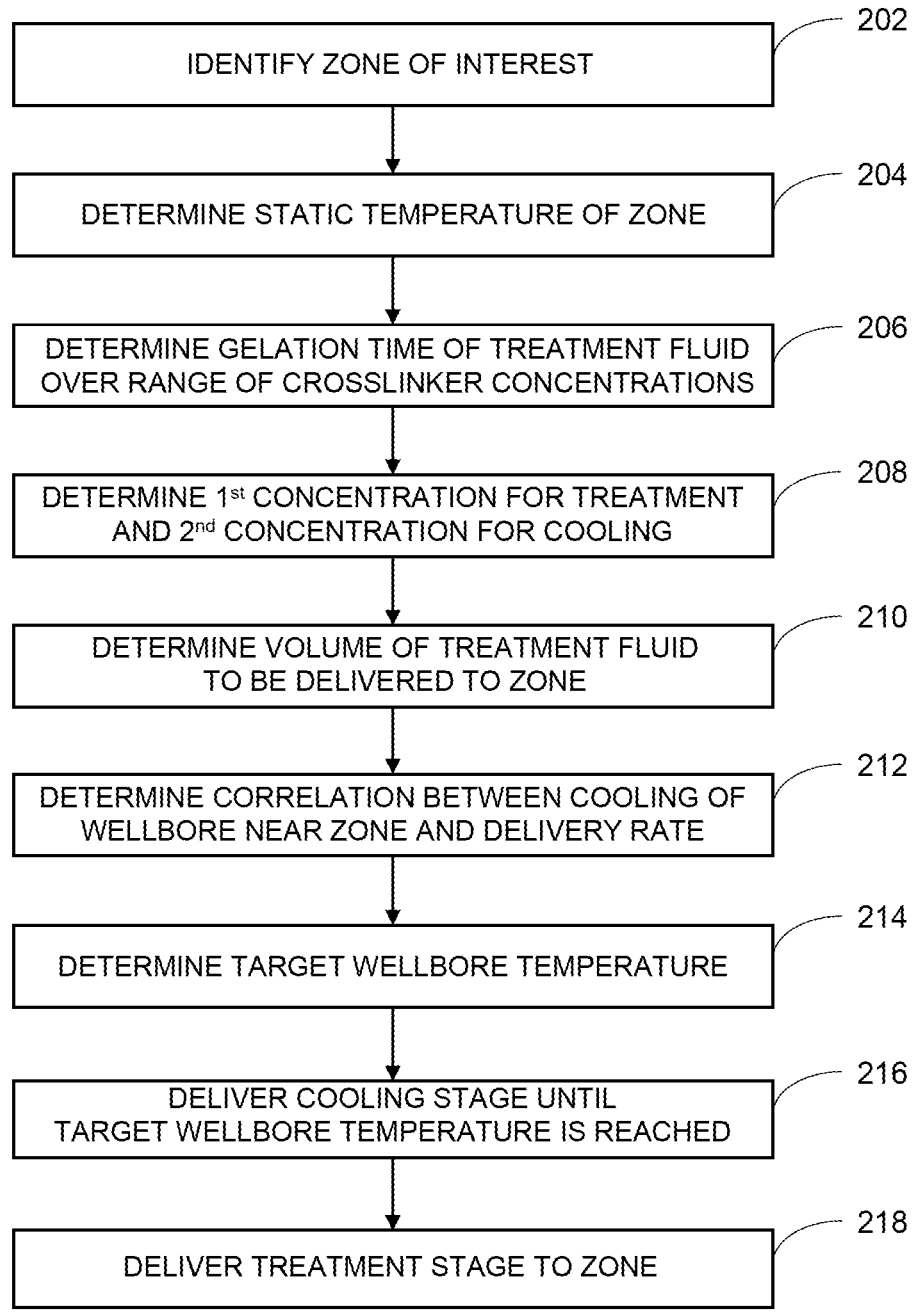
FIG. 2 is a flow chart of an example treatment method that can be implemented on the well of FIGS. 1A, 1B, and 1C.

FIG. 2 is a flow chart of a treatment method 200 that can be implemented on the well 100. At block 202, a zone of interest (such as the zone of interest 110) within the subterranean formation is identified, for example, using a production log. At block 204, a static temperature of the zone of interest 110 is determined, for example, using a temperature sensor. At block 206, a time duration for gelation of a treatment fluid (such as the treatment fluid 122) is determined over a range of concentrations of a cross-linker. The treatment fluid 122 includes a polymer and the cross-linker. In some implementations, the first concentration is in a range of from about 1 volume percent (vol. %) to about 10 vol. % or from about 3 vol. % to about 6 vol. %. Time durations for gelation of the treatment fluid 122 over the range of cross-linker concentrations are determined at various temperatures at block 206. The various temperatures include the static temperature of the zone of interest 110 determined at block 204. For example, time durations for gelation of the treatment fluid 122 over the range of cross-linker concentrations are determined at a first temperature, and time durations for gelation of the treatment fluid 122 over the range of cross-linker concentrations are determined at a second temperature, and so on for each selected temperature.

At block 208, a first concentration of the cross-linker is determined for a treatment stage, and a second concentration of the cross-linker is determined for a cooling stage based on the time durations for gelation of the treatment fluid 122 determined at block 206. At block 210, a treatment volume of the treatment stage to be delivered to the zone of interest 110 is determined. At block 212, a correlation between cooling of the wellbore 102 near the zone of interest 110 and a delivery rate of the treatment fluid 122 to be delivered to the zone of interest 110 is determined. Delivering the treatment fluid 122 and/or fresh water to the subterranean formation via the wellbore 102 can alter the temperature of the wellbore 102. For example, delivering the treatment fluid 122 and/or fresh water to the subterranean formation via the wellbore 102 can cause the wellbore 102 to cool. At block 214, a target wellbore temperature for the wellbore 102 is determined. The target wellbore temperature determined at block 214 is less than the static temperature of the zone of interest 110 determined at block 204. In some implementations, a difference between the target wellbore temperature and the static temperature of the zone of interest 110 is 50 degrees Fahrenheit (° F.) differential or less, 40° F. differential or less, 35° F. differential or less, or 30° F. differential or less. In some implementations, a difference between the target wellbore temperature and the static temperature of the zone of interest 110 is at least 30° F. differential, at least 35° F. differential, at least 40° F. differential, or at least 50° F. differential.

At block 216, the cooling stage is delivered to the subterranean formation via the wellbore 102 until the wellbore 102 near the zone of interest 110 reaches the target wellbore temperature (determined at block 214). In some implementations, the cooling stage is delivered at a delivery rate in a range of from about 1 barrel per minute (bpm) to about 2 bpm at block 216. In some implementations, the cooling stage is delivered at a delivery rate of less than about 1 bpm at block 216. In some implementations, the cooling stage is delivered at a delivery rate of greater than about 2 bpm at block 216. The cooling stage can be similar to the treatment fluid 122. The cooling stage includes the polymer and the second concentration of the cross-linker. The second concentration of the cross-linker in the cooling stage is different from the first concentration of the cross-linker in the treatment stage. In some implementations, the second concentration is less than the first concentration. In some implementations, each of the first concentration and the second concentration are in a range of from about 1 vol. % to about 10 vol. %. In some implementations, the second concentration is in a range of from about 1 vol. % to about 2 vol. %.

After delivering the cooling stage at block 216, the treatment volume (determined at block 210) of the treatment stage is delivered to zone of interest 110 via the wellbore 102 at block 218. Delivering the treatment stage to the zone of interest 110 at block 218 results in forming a gel that is impermeable to fluid flow within the zone of interest 110. The gel that is formed is impermeable to fluid flow and can therefore shut off water and/or gas breakthrough. The treatment stage can be the same as or similar to the treatment fluid 122. The treatment stage includes the polymer and the first concentration of the cross-linker. In some implementations, the first concentration is in a range of from about 1 vol. % to about 10 vol. % or from about 3 vol. % to about 6 vol. %. In some implementations, a delivery rate at which the treatment stage is delivered to the zone of interest 110 at block 218 is the maximum allowable pumping rate that can be handled by the downhole equipment and surface pumps without running the risk of damaging the wellbore 102 and/or fracturing the subterranean formation. In some implementations, the treatment stage is delivered at a delivery rate in a range of from about 1 bpm to about 2 bpm at block 218. In some implementations, the treatment stage is delivered at a delivery rate of less than about 1 bpm at block 218. In some implementations, the treatment stage is delivered at a delivery rate of greater than about 2 bpm at block 218. In some implementations, the delivery rate at block 218 is about 2 bpm. In some implementations, the delivery rate at block 218 is adjustable throughout implementation of block 218. For example, while the treatment stage is being delivered at block 218, if the temperature of the wellbore 102 near the zone of interest 110 begins to decrease (that is, the treatment stage is cooling too quickly), the delivery rate at block 218 can be decreased. For example, while the treatment stage is being delivered at block 218, if the temperature of the wellbore 102 near the zone of interest 110 begins to increase (that is, the treatment stage is cooling too slowly), the delivery rate at block 218 can be increased. As such, the delivery rate at block 218 can fluctuate during the duration of block 218 to maintain a desired temperature of the wellbore 102 near the zone of interest 110 or to keep the wellbore 102 near the zone of interest 110 within a desired temperature window. The delivery rate at block 218 can be adjusted throughout implementation of block 218, such that a temperature of the wellbore 102 near the zone of interest 110 is maintained at the target wellbore temperature (determined at block 214). The delivery rate at block 218 can be adjusted throughout implementation of block 218, such that a temperature of the wellbore 102 near the zone of interest 110 is maintained within 50° F. differential or within 25° F. differential of the target wellbore temperature (determined at block 214). In some implementations, the wellbore 102 is not shut in throughout implementation of method 200.

In some implementations, a flush stage is delivered to the subterranean formation via the wellbore 102 after delivering the treatment stage at block 218. The flush stage can include water. In some implementations, the flush stage is fresh water. In some implementations, the flush stage is delivered at a delivery rate of about 0.5 bpm or less. In some implementations, a hydrocarbon is produced from the subterranean formation after delivering the flush stage, once the gel has been formed within the zone of interest 110.

In some implementations, the cooling stage and the treatment stage are delivered (blocks 216 and 218, respectively) using a coiled tubing installed in the wellbore 102. In some implementations, after delivering the treatment stage at block 218, the coiled tubing is removed from the wellbore 102 (also referred to as rigging down the coiled tubing), and then hydrocarbons can be produced from the subterranean formation, in some cases, immediately after the coiled tubing (and other equipment, for example, attached to the coiled tubing) has been removed.

Figure 3:
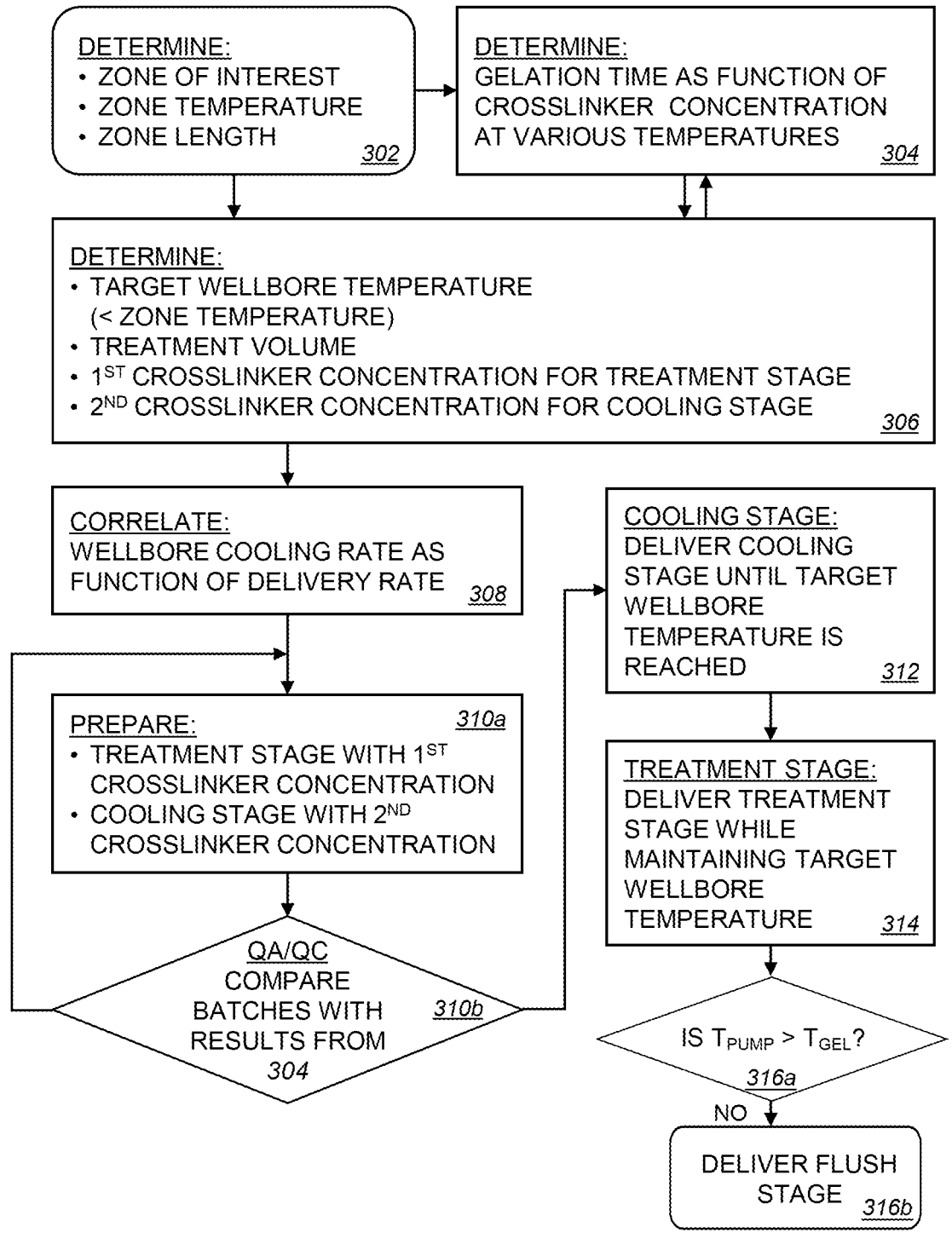
FIG. 3 is a flow chart of an example treatment method that can be implemented on the well of FIGS. 1A, 1B, and 1C.

FIG. 3 is a flow chart of a treatment method 300 that can be implemented on the well 100. At block 302, a zone of interest (such as the zone 110) of a subterranean formation is determined. The zone of interest 110 is identified at block 302 as a zone of the subterranean formation in which fluid flow is undesired and is therefore the target zone for a blockage is to be formed. For example, the zone 110 has exhibited water and/or gas breakthrough and is identified at block 302 as the zone of interest 110. At block 302, a temperature of the zone of interest 110 is determined, for example, using a temperature sensor. At block 302, a length of the zone of interest 110 is determined. In some implementations, at least one of the features determined at block 302 (zone of interest 110, temperature of the zone of interest 110, length of zone of interest 110) are determined using a production log. At block 304, gelation time of a treatment fluid (such as the treatment fluid 122) as a function of cross-linker concentration over a range of temperatures is determined. The range of temperatures includes the temperature of the zone of interest 110 determined at block 302. The treatment fluid 122 includes a polymer and the cross-linker.

At block 306, a target wellbore temperature is determined. The target wellbore temperature determined at block 306 is less than the temperature of the zone of interest 110 determined at block 302. In some implementations, the target wellbore temperature determined at block 306 is at most 50° F. less than the temperature of the zone of interest 110 determined at block 302. In other words, a difference between the target wellbore temperature determined at block 306 and the temperature of the zone of interest 110 determined at block 302 can be 50° F. differential or less. For example, if the temperature of the zone of interest 110 was determined to be 122° F. at block 302, then the target wellbore temperature determined at block 306 is less than 122° F. and can be at least 72° F. In some implementations, the range of temperatures tested for the gelation times of the treatment fluid 122 determined at block 304 includes the target wellbore temperature determined at block 306. In some implementations, the range of temperatures tested for the gelation times of the treatment fluid 122 determined at block 304 ranges from the target wellbore temperature determined at block 306 to the temperature of the zone of interest 110 determined at block 302. In some implementations, the range of temperatures tested for the gelation times of the treatment fluid 122 determined at block 304 ranges from a temperature less than the target wellbore temperature determined at block 306 to a temperature greater than the temperature of the zone of interest 110 determined at block 302. For example, the range of temperatures tested for the gelation times of the treatment fluid 122 determined at block 304 ranges from 10° F. less than the target wellbore temperature determined at block 306 to 10° F. greater than the temperature of the zone of interest 110 determined at block 302.

At block 306, a treatment volume of a treatment stage to be delivered to the zone of interest 110 is determined. At block 306, a first concentration of the cross-linker is determined for the treatment stage based on the time durations for gelation of the treatment fluid 122 determined at block 304. At block 306, a second concentration of the cross-linker is determined for a cooling stage based on the time durations for gelation of the treatment fluid 122 determined at block 304. The second concentration of the cross-linker in the cooling stage is different from the first concentration of the cross-linker in the treatment stage. In some implementations, the second concentration is less than the first concentration. In some implementations, each of the first concentration and the second concentration are in a range of from about 1 vol. % to about 10 vol. %. In some implementations, the first concentration is in a range of from about 3 vol. % to about 6 vol. %. In some implementations, the second concentration is in a range of from about 1 vol. % to about 2 vol. %. In some cases, it can be advantageous to select the first concentration for the treatment stage to be a cross-linker concentration at which the gelation time of the treatment stage varies greatly (for example, from 30 minutes to 2 hours) over a small temperature range (for example, a range of 20° F. differential) in order to allow pumping the required treatment volume as the treatment stage also gels within the formation.

At block 308, a cooling rate of the wellbore 102 near the zone of interest 110 as a function of a delivery rate of the treatment fluid 122 to be delivered to the zone 110 is determined. Delivering the treatment fluid 122 and/or fresh water to the subterranean formation via the wellbore 102 can alter the temperature of the wellbore 102. For example, delivering the treatment fluid 122 and/or fresh water to the subterranean formation via the wellbore 102 can cause the wellbore 102 to cool.

At block 310a, the treatment stage including the first concentration of the cross-linker (determined at block 306) is prepared. At block 310a, the cooling stage including the second concentration of the cross-linker (determined at block 306) is prepared. Each of the treatment stage and the cooling stage prepared at block 310a include a mixture of the polymer and the cross-linker at varying concentrations.

At block 310b, a yard test is performed to check the timing of mixing of the polymer and the cross-linker in the treatment stage and the cooling stage and to check the quality of the mixed batches of the treatment stage and the cooling stage. The results of the yard test at block 310b are compared to the results determined at block 304 to ensure the batches of the treatment stage and the batches of the cooling stage match the expected behavior once they have been delivered downhole to the subterranean formation via the wellbore 102. If the results of the yard test at block 310b do not match the results determined at block 304 as expected, the treatment stage and the cooling stage are re-prepared at block 310a. Once the results of the yard test at block 310 match the results determined at block 304 as expected, the method 300 proceeds to block 312.

At block 312, the cooling stage is delivered to the subterranean formation via the wellbore 102 until the wellbore 102 near the zone of interest 110 reaches the target wellbore temperature (determined at block 306). In some implementations, the cooling stage is delivered at a delivery rate in a range of from about 1 bpm to about 2 bpm at block 312. In some implementations, the cooling stage is delivered at a delivery rate of less than about 1 bpm at block 312. In some implementations, the cooling stage is delivered at a delivery rate of greater than about 2 bpm at block 312.

After delivering the cooling stage at block 312, the treatment volume (determined at block 306) of the treatment stage is delivered to zone of interest 110 via the wellbore 102 at block 314. Delivering the treatment stage to the zone of interest 110 at block 314 results in forming a gel that is impermeable to fluid flow within the zone of interest 110. The gel that is formed is impermeable to fluid flow and can therefore shut off water and/or gas breakthrough. In some implementations, a delivery rate at which the treatment stage is delivered to the zone of interest 110 at block 314 is the maximum allowable pumping rate that can be handled by the downhole equipment and surface pumps without running the risk of damaging the wellbore 102 and/or fracturing the subterranean formation. In some implementations, the treatment stage is delivered at a delivery rate in a range of from about 1 bpm to about 2 bpm at block 314. In some implementations, the treatment stage is delivered at a delivery rate of less than about 1 bpm at block 314. In some implementations, the treatment stage is delivered at a delivery rate of greater than about 2 bpm at block 314. In some implementations, the delivery rate at block 314 is about 2 bpm. In some implementations, the delivery rate at block 314 is adjustable throughout implementation of block 314. In some implementations, the delivery rate at block 314 is adjusted throughout implementation of block 314, such that a temperature of the wellbore 102 near the zone of interest 110 is maintained at the target wellbore temperature (determined at block 306). In some implementations, the delivery rate at block 314 is adjusted throughout implementation of block 314, such that a temperature of the wellbore 102 near the zone of interest 110 is maintained within 50° F. differential of the target wellbore temperature (determined at block 306). In some implementations, the wellbore 102 is not shut in throughout implementation of method 300.

At block 316a, a pumping time ($T_{PUMP}$, the time it takes to deliver the treatment stage to the zone of interest 110) for delivering the treatment stage (block 314) is compared to the gelation time ($T_{GEL}$, the time it takes for the treatment stage to gel within the zone of interest 110) of the treatment stage (determined at block 304 and 306). If the pumping time ($T_{PUMP}$) is equal to or less than the gelation time ($T_{GEL}$) of the treatment stage delivered at block 314, the method 300 proceeds to block 316b.

At block 316b, a flush stage is delivered to the subterranean formation via the wellbore 102. The flush stage can include water. In some implementations, the flush stage is fresh water. In some implementations, the flush stage is delivered at a delivery rate of about 0.5 bpm at block 316b.

In some implementations, a hydrocarbon is produced from the subterranean formation after delivering the flush stage at block 316b, once the gel has been formed within the zone 110.

In some implementations, if the pumping time ($T_{PUMP}$) is greater than the gelation time ($T_{GEL}$) of the treatment stage delivered at block 314, a spacing stage is delivered to the subterranean formation via the wellbore 102. The spacing stage can be similar to the treatment fluid 122. The spacing stage includes the polymer and the cross-linker. In some implementations, the spacing stage is the same as the cooling stage. For example, the spacing stage includes the polymer and the second concentration of the cross-linker (same as the cooling stage delivered at block 312). In some implementations, the volume of the spacing stage is equal to the sum of the volume of the coiled tubing and the volume of the wellbore 102. After the spacing stage, the method 300 returns to block 314. In some implementations, the method cycles between block 314 and delivering a spacing stage until the full treatment volume (determined at block 306) of the treatment stage is delivered to the zone of interest 110.

In some implementations, the cooling stage, the treatment stage, and the flush stage are delivered (blocks 312, 314, and 316b, respectively) using a coiled tubing installed in the wellbore 102. In some implementations, after delivering the flush stage at block 316, the coiled tubing is removed from the wellbore 102 (also referred to as rigging down the coiled tubing), and then hydrocarbons can be produced from the subterranean formation, in some cases, immediately after the coiled tubing (and other equipment, for example, attached to the coiled tubing) has been removed.

Figure 4:
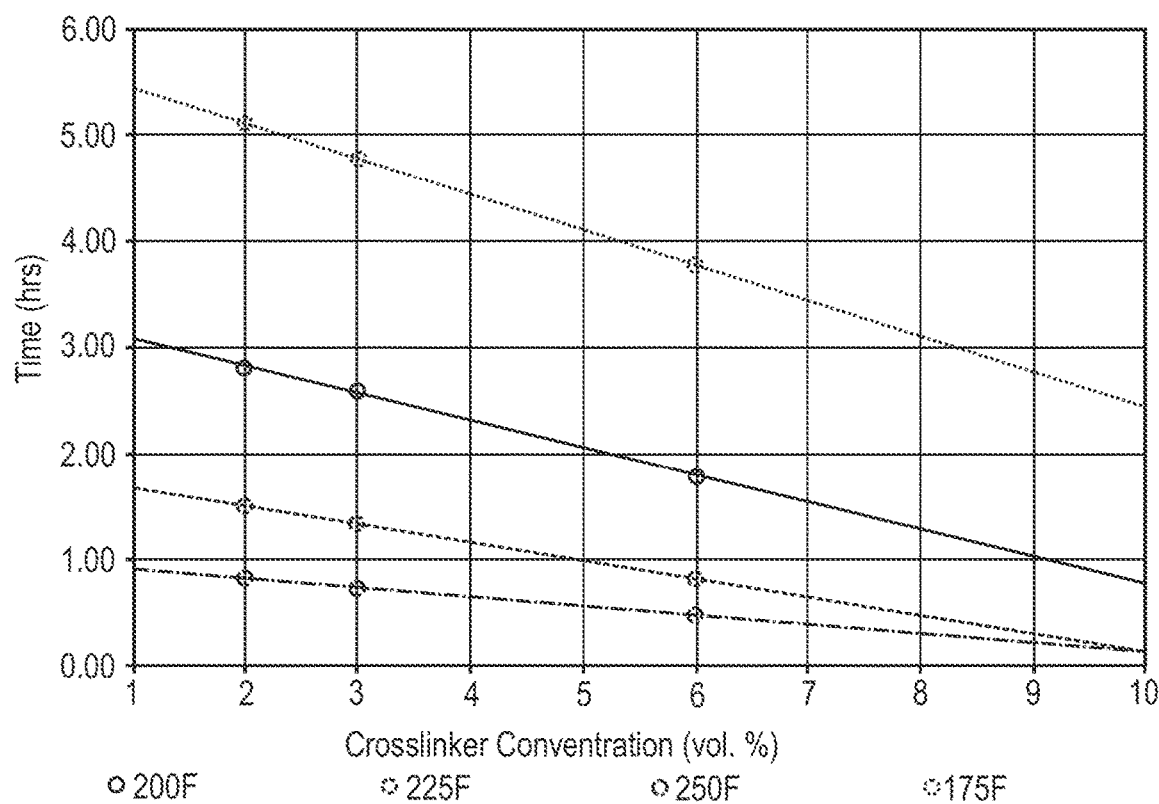
FIG. 4 is an example plot of gelation time versus cross-linker concentration for a treatment fluid.

FIG. 4 is a plot 400 showing gelation time versus cross-linker concentration of a treatment fluid, such as the treatment fluid 122. The curves are for different temperatures (175° F., 200° F., 225° F., and 250° F.). As shown in plot 400, gelation time decreases with increased cross-linker concentration. Gelation time also decreases with increased temperature. Understanding the relationship between cross-linker concentration, temperature, and gelation time can be useful in determining parameters such as maximum allowable treatment stage volume (for example, determined at block 204 of method 200), number of treatment stages (for example, determined at block 212 of method 200), and minimum delivery duration and/or rate (for example, determined at block 206 of method 200).

Figure 5:
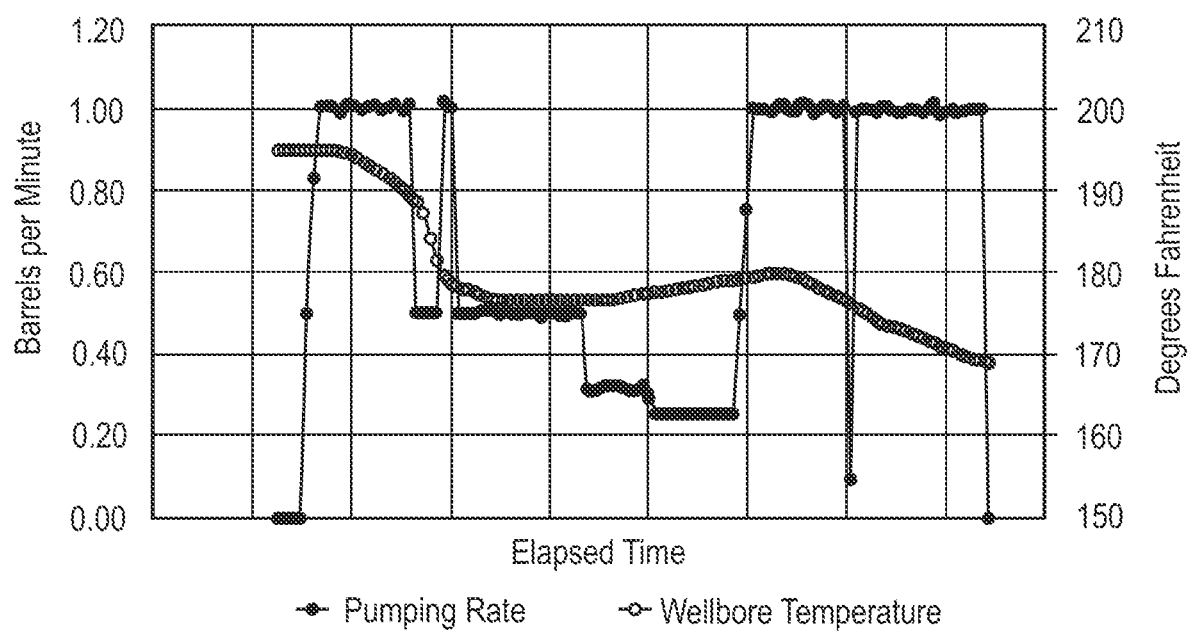
FIG. 5 is an example plot showing a relationship between wellbore temperature and fluid delivery rate into the wellbore.

FIG. 5 is a plot 500 showing wellbore temperature in relation to fresh water delivery rate to the wellbore. As shown in plot 500, larger pumping rates result in decreases in wellbore temperature. It is assumed that the fresh water being delivered to the wellbore is cooler than the fluids already disposed within the wellbore (for example, wellbore fluids). Understanding the relationship between delivery rate and wellbore cooling allows for the wellbore temperature to be maintained at a target temperature that is less than the temperature of the zone of interest throughout implementation of the selective zonal isolation treatment operation, such that the gel impermeable to fluid flow forms in the zone of interest and not in the wellbore 102 itself. For example, for a target wellbore temperature of 175° F., a treatment volume of 200 barrels of the treatment stage with a cross-linker concentration of 6 vol. % at a delivery rate of 1 bpm can have a gelation time of 226 minutes (for example, determined at block 206), which is much longer than the gelation time of 107 minutes inside the zone of interest 110 (for example, determined at block 206), which has a static temperature of 200° F. (for example, determined at block 204).

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method for zonal isolation in a subterranean formation, the method comprising:
   identifying a zone of interest within the subterranean formation;
   determining a static temperature of the zone of interest;
   for each of a plurality of temperatures, determining a time duration for gelation of a treatment fluid over a range of concentrations of a cross-linker, wherein at least one of the plurality of temperatures is the static temperature, the treatment fluid comprises a polymer and the cross-linker, and the cross-linker is configured to cause cross-linking of the polymer;
   based on the determined time durations for gelation of the treatment fluid over the range of concentrations of the cross-linker, determining a first concentration of the cross-linker for a treatment stage and determining a second concentration of the cross-linker for a cooling stage;
   determining a treatment volume of the treatment stage to be delivered to the zone of interest;
   determining a correlation between cooling of a wellbore formed in the subterranean formation near the zone of interest and a delivery rate of the treatment stage to be delivered to the zone of interest;
   determining a target wellbore temperature for the wellbore, wherein the target wellbore temperature is less than the static temperature of the zone of interest;
   delivering the cooling stage to the subterranean formation via the wellbore until the wellbore near the zone of interest reaches the target wellbore temperature, wherein the cooling stage comprises the polymer and the second concentration of the cross-linker;
   after delivering the cooling stage, delivering the treatment volume of the treatment stage to the zone of interest via the wellbore, thereby forming, within the zone of interest, a gel that is impermeable to fluid flow, wherein the treatment stage comprises the polymer and the first concentration of the cross-linker, wherein the cooling stage and the treatment stage are delivered to the subterranean formation using a coiled tubing installed in the wellbore.

2. The method of claim 1, wherein the second concentration of the cross-linker for the cooling stage is less than the first concentration of the cross-linker for the treatment stage.

3. The method of claim 2, comprising producing a hydrocarbon from the subterranean formation after delivering the treatment stage.

4. The method of claim 3, wherein the wellbore is not shut in throughout implementation of the method.

5. The method of claim 4, comprising removing the coiled tubing from the wellbore after delivering the treatment stage, wherein producing the hydrocarbon from the subterranean formation occurs after removing the coiled tubing.

6. The method of claim 5, comprising delivering a flush stage to the subterranean formation via the wellbore after delivering the treatment stage, wherein the flush stage comprises water.

7. The method of claim 5, wherein each of the first concentration and the second concentration are in a range of from about 1 volume percent (vol. %) to about 10 vol. %.

8. The method of claim 5, wherein a difference between the target wellbore temperature and the static temperature is 50 degrees Fahrenheit differential or less.

9. The method of claim 8, wherein the difference between the target wellbore temperature and the static temperature is 25 degrees Fahrenheit differential or less.

10. The method of claim 5, wherein delivering the treatment stage comprises delivering the treatment stage at an adjustable delivery rate, such that a temperature of the wellbore near the zone of interest is maintained at the target wellbore temperature.

11. The method of claim 5, wherein delivering the treatment stage comprises delivering the treatment stage at an adjustable delivery rate, such that the temperature of the wellbore near the zone of interest is maintained within 50 degrees Fahrenheit differential of the target well bore temperature.

12. The method of claim 5, wherein delivering the treatment stage comprises delivering the treatment stage at an adjustable delivery rate, such that the temperature of the wellbore near the zone of interest is maintained within 25 degrees Fahrenheit differential of the target well bore temperature.

* * * * *

UNITED STATES PATENT AND TRADEMARK OFFICE
CERTIFICATE OF CORRECTION

PATENT NO. : 11,708,521 B2
APPLICATION NO. : 17/644217
DATED : July 25, 2023
INVENTOR(S) : Mohamed Hassan Sherief et al.

It is certified that error appears in the above-identified patent and that said Letters Patent is hereby corrected as shown below:

In the Claims

In Column 16, Line 40, Claim 11, please replace "well bore" with -- wellbore --;

In Column 16, Line 46, Claim 12, please replace "well bore" with -- wellbore --.

Signed and Sealed this
Fourteenth Day of November, 2023

*Katherine Kelly Vidal*

Katherine Kelly Vidal
*Director of the United States Patent and Trademark Office*